US009365316B2

(12) United States Patent
Flank et al.

(10) Patent No.: US 9,365,316 B2
(45) Date of Patent: Jun. 14, 2016

(54) CONTAINER WITH SUB-CHAMBERS SEPARATED BY PEELABLE SEAL

(75) Inventors: Peder Flank, Bjarred (SE); Michaela Hagermark, Malmo (SE); Maria Leonora, Lund (NL); Petronella Schroder, Malmo (SE); Jens Gustafsson, Malmo (SE); Emma Leander, Hagersten (SE)

(73) Assignee: Gambro Lundia AB, Lund (SE)

( * ) Notice: Subject to any disclaimer, the term of this patent is extended or adjusted under 35 U.S.C. 154(b) by 173 days.

(21) Appl. No.: 14/128,924

(22) PCT Filed: Jun. 18, 2012

(86) PCT No.: PCT/EP2012/061553
§ 371 (c)(1),
(2), (4) Date: Jun. 30, 2014

(87) PCT Pub. No.: WO2012/175436
PCT Pub. Date: Dec. 27, 2012

(65) Prior Publication Data
US 2014/0319150 A1 Oct. 30, 2014

Related U.S. Application Data

(60) Provisional application No. 61/499,751, filed on Jun. 22, 2011.

(30) Foreign Application Priority Data

Jun. 22, 2011 (SE) .................................... 1150576

(51) Int. Cl.
*B65D 25/08* (2006.01)
*A61J 1/10* (2006.01)
(Continued)

(52) U.S. Cl.
CPC . *B65D 25/08* (2013.01); *A61J 1/10* (2013.01); *A61J 1/2093* (2013.01); *B29C 65/02* (2013.01);
(Continued)

(58) Field of Classification Search
CPC ....... A61J 1/2024; A61J 1/202; A61J 1/2027; A61J 1/2093; A61J 1/10; A61J 1/2003; B65D 25/08; B65D 25/082; B65D 81/3261; B65D 81/3266; B65D 81/32
See application file for complete search history.

(56) References Cited

U.S. PATENT DOCUMENTS 3,847,279 A 11/1974 Montgomery
4,410,321 A * 10/1983 Pearson ................ A61J 1/2089
604/410

(Continued)

FOREIGN PATENT DOCUMENTS

EP  0 132 632 A2  2/1985
JP  63-309263  12/1988
(Continued)

OTHER PUBLICATIONS

International Search Report for PCT/EP2012/061553 (Sep. 17, 2012).

*Primary Examiner* — Anthony Stashick
*Assistant Examiner* — Mollie Llewellyn
(74) *Attorney, Agent, or Firm* — K&L Gates LLP

(57) ABSTRACT

A container including a first side wall and a second side wall that are permanently joined by at least one seam such that a chamber is formed between the side walls. A peelable seal separates the chamber into a first sub-chamber and a second sub-chamber that are capable of receiving liquid contents, which may be mixed if the peelable seal is opened. The seam includes a protrusion that extends into the chamber, and the peelable seal extends over the protrusion.

11 Claims, 4 Drawing Sheets

(51) Int. Cl.
  *A61J 1/20* (2006.01)
  *B29C 65/76* (2006.01)
  *B29C 65/00* (2006.01)
  *B65D 81/32* (2006.01)
  *B29C 65/02* (2006.01)
  *B29L 31/00* (2006.01)
  *B29C 65/08* (2006.01)
  *B29C 65/10* (2006.01)
  *B29C 65/18* (2006.01)
  *B29C 65/04* (2006.01)

(52) U.S. Cl.
  CPC .............. *B29C 65/76* (2013.01); *B29C 66/1122* (2013.01); *B29C 66/3452* (2013.01); *B29C 66/3472* (2013.01); *B29C 66/43* (2013.01); *B29C 66/73921* (2013.01); *B65D 81/3266* (2013.01); *A61J 1/202* (2015.05); *A61J 1/2024* (2015.05); *B29C 65/04* (2013.01); *B29C 65/08* (2013.01); *B29C 65/10* (2013.01); *B29C 65/18* (2013.01); *B29C 66/43121* (2013.01); *B29C 66/53262* (2013.01); *B29L 2031/7148* (2013.01)

(56) References Cited

U.S. PATENT DOCUMENTS

| | | | |
|---|---|---|---|
| 7,678,097 | B1 | 3/2010 | Peluso et al. |
| 2001/0000042 | A1 | 3/2001 | Inuzuka et al. |
| 2004/0137177 | A1 | 7/2004 | Saito et al. |
| 2005/0221034 | A1 | 10/2005 | Iwasaki et al. |
| 2009/0113753 | A1 | 5/2009 | Pepper et al. |
| 2009/0166363 | A1 | 7/2009 | Balteau |
| 2009/0254032 | A1 | 10/2009 | Muramatsu |
| 2010/0084021 | A1* | 4/2010 | Karabinis .......... B65D 81/3216 137/3 |

FOREIGN PATENT DOCUMENTS

| | | |
|---|---|---|
| JP | 2000-7050 | 1/2000 |
| JP | 2005-288022 | 10/2005 |
| JP | 2006-280435 | 10/2006 |
| JP | 2008-150096 | 7/2008 |
| JP | 2009-160266 | 7/2009 |
| WO | 94/25252 A1 | 11/1994 |
| WO | 2007/041408 A2 | 4/2007 |

* cited by examiner

| 91 Press first sub-chamber such that peelable seal opens | → | 92 Repeatedly press on first and second sub-chambers |

CONTAINER WITH SUB-CHAMBERS SEPARATED BY PEELABLE SEAL

CROSS RELATED APPLICATION

This application is the U.S. national phase of International Application No. PCT/EP2012/061553 filed 18 Jun. 2012 which designated the U.S. and claims priority to U.S. Patent Application Ser. No. 61/499,751 filed 22 Jun. 2011 and Swedish Patent Application No. 1150576-5 filed 22 Jun. 2011, the entire contents of these applications are hereby incorporated by reference.

TECHNICAL FIELD

The invention relates to a container with a peelable seal that separates two sub-chambers for allowing, if the peelable seal is opened, liquid contents of the sub-chambers to be mixed.

BACKGROUND ART

One type of treatment for patients that have impaired renal function, or kidney failure, is known as dialysis. Either hemodialysis (blood dialysis) or peritoneal dialysis methods may be employed. Both methods essentially involve the removal of toxins from body fluids and restoration of such body fluids by diffusion and/or convection by means of a dialysis solution.

In peritoneal dialysis, a dialysis solution in liquid form is administered directly into the patient's peritoneal cavity. Conventionally, for preventing insoluble precipitates to form from components of the dialysis solution, the dialysis solution is prepared from a first liquid solution and a second liquid solution that are kept separate and mixed just prior the administration to a patient.

The liquid solutions that form the dialysis solution when mixed are often kept separate in a flexible container made of plastic films. The container must keep the solutions sterile since the dialysis solution is infused directly into the peritoneal cavity of a patient. Also, the containers must withstand conventional handling during transportation and storage, while still allowing efficient mixing of the liquid solutions.

Some designs of flexible containers have been accomplished, as reflected by patent documents US2005221034A1, U.S. Pat. No. 7,678,097B1 and WO9425252A1. These documents disclose containers where liquid contents (solutions) are stored in separate chambers. Before administration a seal that separates the chambers is broken, which allows the liquid solutions to mix and form a dialysis solution in the respective container.

The disclosed containers separate two liquid contents from each other but do not seem optimal in respect of their handling, in particular in respect of allowing the contents to be efficiently mixed with a reasonable effort.

SUMMARY

One object of the invention is to provide an improvement of the above-identified prior art. In particular, one object is to provide a container with at least two sub-chambers that may be filled with liquid contents that may easily be mixed.

According to the present invention a container is provided, which comprises a first side wall and a second side wall. The side walls are permanently joined by at least one seam such that a chamber is formed between the side walls. A peelable seal separates the chamber into a first sub-chamber capable of receiving a first liquid content and a second sub-chamber capable of receiving a second liquid content. This allows, if the peelable seal is opened, a liquid content of the first sub-chamber to be mixed with a liquid content of the second sub-chamber. The seam comprises a protrusion that extends into the chamber, and the peelable seal extends over the protrusion.

The peelable seal may be opened by manually pressing on one of the sub-chambers. This results in an increase of a pressure within the pressed sub-chamber, which eventually causes the peelable seal to rupture (open) such that liquid contents of the sub-chambers may be mixed. The protrusion and the extension of the peelable seal over the protrusion assist in applying an even pressure over the peelable seal, which results in that a relatively large part of the seal may be opened. An effect of a relatively larger opening of the peelable seal is that liquid contents of the sub-chambers may be mixed more easily.

The extension of the peelable seal over the protrusion also reduces the emergence of micro-fractures that otherwise may form at locations where the peelable seal joins the seam. An effect of this is that the container becomes more durable in the sense that the risk of unintentional opening of the peelable seal is reduced. In one embodiment the peelable seal is welded over the protrusion.

The protrusion may protrude into the chamber from an edge portion of the seam.

The protrusion may be arranged at an end of an elongated section of the seam that extends into the chamber.

The protrusion may form a loop. Alternatively or additionally, the loop may have a bent shape, and/or the loop may have a curvature at least partially defined by a radial value.

The first side wall and the second side wall may be unjoined at a section enclosed by the loop.

The seam may comprise a further protrusion that extends into the chamber, and the peelable seal may extend over the further protrusion. The further protrusion may form a loop.

A section of the peelable seal may, in a direction towards the second sub-chamber, be offset from a line that extends between a first end point of the peelable seal and a second end point of the peelable seal.

The peelable seal may have a curvature that is at least partially defined by a radial value.

The peelable seal may be configured to separate the first and second sub-chambers such that a volume of the first sub-chamber is at least six times greater than a volume of the second sub-chamber. In one embodiment of the invention the volume of the first sub-chamber is at least 12 times greater than the total volume of the second and the third sub-chamber. In one embodiment of the invention the volume of the first sub-chamber is at least 20 times greater than the total volume of the second and the third sub-chamber.

The container may comprise a second peelable seal that separates the chamber into the first sub-chamber and a third sub-chamber capable of receiving a third content, thereby allowing, when the second peelable seal is opened, a content of the third sub-chamber to be mixed with a content of the first sub-chamber.

The first sub-chamber may comprise a first liquid content, the second sub-chamber may comprise a second liquid content, and a mixture of the liquid contents may form a dialysis solution.

According to another aspect a method is provided for mixing contents of a container. The container comprises a first side wall and a second side wall that are permanently joined by at least one seam such that a chamber is formed between the side walls. A peelable seal separates the chamber into a first sub-chamber comprising a first liquid content and into a second sub-chamber comprising a second liquid content. The seam comprises a protrusion that extends into the chamber and the peelable seal extends over the protrusion. The method comprises i) pressing on the second sub-chamber such that the peelable seal opens, and ii) repeatedly pressing on each of the first and second sub-chambers for allowing the contents of the sub-chambers to be mixed.

The container that is used in the method may comprise any of the features of the previously described container.

BRIEF DESCRIPTION OF THE DRAWINGS

Embodiments of the invention will now be described, by way of example, with reference to the accompanying schematic drawing, in which.

DETAILED DESCRIPTION

Figures 1, 2, 3:
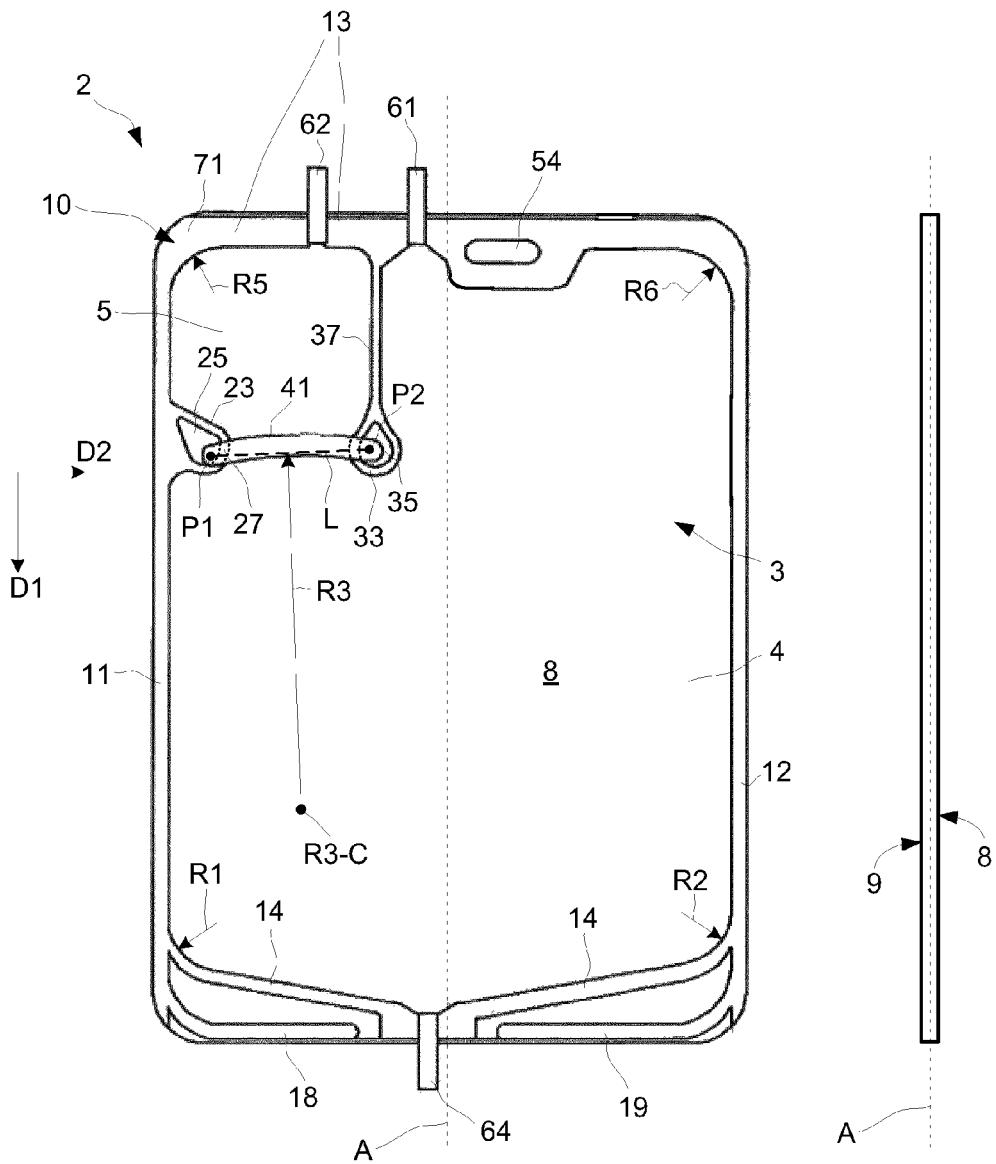
FIG. 1 is a front view of a container with sub-chambers.
FIG. 2 is a side view of the container of FIG. 1.
FIG. 3 is a flow chart of a method for mixing contents of the container of FIG. 1.

With reference to FIG. 1 and FIG. 2 an embodiment of a container 2 for holding contents is illustrated. The contents are typically liquid contents and a mixture of the contents may form a dialysis solution to be used for peritoneal dialysis or for hemodialysis.

The container 2 has a first side wall 8 and a second side wall 9 that are joined along a seam 10. The seam 10 has a first seam side 11 that is opposite a second seam side 12. The first seam side 11 and the second seam side 12 are joined by a third seam side 13 and by a fourth seam side 14 that is opposite the third seam sides 13, such that the seam sides 11, 12, 13, 14 form a chamber 3 between the side walls 8, 9. In the illustrated embodiment, the four seam sides 11, 12, 13, 14 form a seam 10 with a substantially rectangular shape, where the chamber 3 is defined by the periphery of the rectangle-shaped seam 10.

It may be said that the container 2 extends along a longitudinal direction D1, where the third seam side 13 and the fourth seam side 14 define longitudinal boundaries. The container 2 also extends along a transverse direction D2, where the first seam side 11 and the second seam side 12 define transverse boundaries. Thus, the container 2 has a longitudinal height that in principle is defined by the distance between the fourth seam side 14 and the third seam side 13, and a transverse width that in principle is defined by the distance between the first seam side 11 and the second seam side 12.

The side walls 8, 9 are made of a flexible, thermoplastic film suitable for heat welding, and the seam 10 is formed by a heat welding process that permanently joins the side walls 8, 9 at the seam 10. The seam 10 is unpeelable in the sense that the side walls 8, 9 form a permanent bond that may not be broken without rupturing the first side wall 8 and/or the second side wall 9. Any conventional plastic material and processes suitable for heat welding (heat fusion) may be used. Other types of material for the side walls 8, 9 and welding techniques such as hot gas welding, hot plate welding, high frequency welding and ultrasonic welding may also be used for forming the seam 10. The material of the side walls 8, 9 should be suitable for a medical application and for the selected welding technique.

The third seam side 13 typically represents the upper side of the container 2 when it is arranged for administering a content of the container 2. For this purpose the third seam side 13 has a through-hole 54 through which a suspension device (not shown) may be inserted, such that the container 2 may hang with the fourth seam side 14 as a lower seam side.

For filling the container 2 with content, the third seam side 13 has a first port for inlet 61 and a second port for inlet 62. The inlets 61, 62 are typically tubes made of plastic that are fused in-between the first side wall 8 and the second side wall 9.

The container 2 may have rounded seam corners. One seam corner 71 is formed where the first seam side 11 and the third seam side 13 join. The seam corner 71 may have a rounded, inner corner defined by a radial value R5. A corresponding seam corner is formed where the second seam side 12 and the third seam side 13 join, which seam corner may have a rounded, inner corner defined by a radial value R6.

In a similar manner a seam corner is formed where the first seam side 11 and the fourth seam side 14 join, and may have a rounded, inner corner defined by a radial value R1. A corresponding seam corner is formed where the second seam side 12 and the fourth seam side 14 join, and may have a rounded, inner corner defined by a radial value R2. In this context the inner corners defines the corners of the chamber 3.

The fourth seam side 14 has an outlet 64 in the form of a tube made of plastic that is fused in-between the first side wall 8 and the second side wall 9. As may be seen, the fourth seam side 14 has in relation to a longitudinal center axis A of the container 2 an inclination towards the outlet 64. Thus, the fourth seam side 14 may be V-shaped where the outlet 64 is arranged at the tip of the "V" and where the ends of the "V" join with the first seam side 11 and the second seam side 12. The seam 10 may include two sections 18, 19 that extend outside the fourth seam side 14 (as seen from the chamber 3). These sections 18, 19 do not define the chamber 3 and have been introduced due to the inclination of the fourth seam side 14, e.g. for purpose of avoiding un-joined, "loose" sections of the side walls 8, 9.

The chamber 3 comprises a first sub-chamber 4 and a second sub-chamber 5. For purpose of forming the sub-chambers 4, 5 the seam 10 has an elongated section 37 that protrudes from the third seam side 13 and into the chamber 3. The elongated section 37 has a long and relatively narrow shape and extends from the third seam side 13 at a position between the first and second inlets 61, 62. The elongated section 37 has at its end a loop 33 that defines a section 35 where the side walls 8, 9 are not joined. The section 35 is typically sealed off from contents of the sub-chambers 4, 5. Each of the elongated section 37 and the loop 33 may be referred to as a protrusion that extends into the chamber 3.

On a substantially same distance from the third seam side 13 as the loop 33, the seam 10 comprises a protrusion 23 that extends into the chamber 3. The protrusion 23 is loop-shaped and defines a section 25 where the side walls 8, 9 are not joined. The section 25 is typically sealed off from any contents of the sub-chambers 4, 5, just like the section 35 formed by the loop 33.

A peelable seal 41 extends between the loop-shaped protrusion 23 and the loop 33 at the elongated section 37. The seam 10, which comprises the elongated section 37, the loop 33 and the protrusion 23, defines in combination with the peelable seal 41 the second sub-chamber 5. Thus, the peelable seal 41 separates any content of the second sub-chamber 5 from any content of the first sub-chamber 4. If the peelable seal 41 is opened (i.e. broken), a content of the second sub-chamber 5 may be mixed with a content of the first sub-chamber 4. The peelable seal 41 may per se be manufactured by employing conventional techniques and procedures within the field of plastic welding. The peelable seal 41 may open if a pressure in the second sub-chamber 5 is properly increased, for example when a user presses on the second sub-chamber 5. Typically, the seam 10 is manufactured by using a first welding temperature while the peelable seal 41 is manufactured thereafter by using a second welding temperature that does not permanently fuse the side walls 8, 9. The second welding temperature is typically lower than the first welding temperature, such that the peelable seal 41 may be welded over or across the seam 10 without affecting the properties of the seam 10. Alternatively the seam 10 may be welded over or across the peelable seal 41 resulting in a portion of the peelable seal becoming a permanent seam 10. From this follows that the seam 10 and the peelable seal 41 may be accomplished by employing a respective type of heat weld, where a bonding strength (between the first side wall 8 and second side wall 9) of the heat weld of the seam 10 is stronger than a corresponding bonding strength of the heat weld of the peelable seal 41.

In detail, the peelable seal 41 has an elongated shape and extends from a first end point P1 to a second end point P2. The first end point P1 is located within the loop-shaped protrusion 23 and the second end point P2 is located within the loop 33. The peelable seal 41 thus intersects both the protrusion 23 and the loop 33 (or vice versa the protrusion 23 and the loop intersect the peelable seal 41). One intersection of the peelable seal 41 and the seam 10 is illustrated by reference numeral 27. However, the peelable seal 41 may extend further, for example over the complete section 25 and to the first seam side 11. In a corresponding manner the peelable seal 41 intersects with the seam 10 at the loop 33 of the elongated section 37. In any case, the peelable seal 41 and the protrusion overlap such that the peelable seal 41 extend over the protrusion 33. Alternatively, the protrusion 33 extends over the peelable seal 41.

The peelable seal 41 may have a bent shape with a curvature that is defined by a radial value R3. The radial value R3 may in turn be defined by a radial centre R3-C located in the first sub-chamber 4. Accordingly, the bent shape may extend into the second sub-chamber 5. The bent shape has been found useful in that the peelable seal 41 may in principle be fully opened when the container 2 holds a content, by a relatively moderate pressure applied on the second sub-chamber 5. The extension into the second sub-chamber 5 may also be achieved by arranging the peelable seal 41 from the first end point P1 to the second end point P2, but offset in a direction towards the second sub-chamber 5 as seen from a straight line L that extends between the first end point P1 and the second end point P2.

In one embodiment the protrusion 23 is omitted. The peelable seal 41 may then extend from the loop 33 and to the first seam side 11, and may intersect the loop 33 and a small part of the first seam side 11.

After manufacturing the container 2 the sub-chambers 4, 5 may be filled with a respective liquid content via the ports for inlet 61, 62, which thereafter are sealed according to conventional techniques.

Examples of contents the sub-chambers may be filled with include e.g. various components of a dialysis solution. For example, the first sub-chamber 4 may be filled with a first liquid content and the second sub-chamber 5 may be filed with a second liquid content. A mixture of the liquid contents may form a dialysis solution for hemodialysis or peritoneal dialysis, and may comprise components like sodium, calcium, magnesium, chloride, potassium, lactate, glucose, dextrose, bicarbonate or amino acids. As is known within the art, some of these components should be kept separate and be mixed only upon use (e.g. calcium and bicarbonate) and are therefore introduced separately in the different sub-chambers 4, 5 of the container 2. At least one sub-chamber (the one that is not pressed on for breaking the peelable seal 41) is typically not completely filled, for allowing a pressure gradient to build up over the peelable seal 41 such that the seal 41 may break. For example, the second sub-chamber 5 may be filled with liquid to a relatively larger extent than the first sub-chamber 4.

Of course, the container 2 may be used in other applications where it is filled with other substances than dialysis related, liquid solutions.

With reference to FIG. 3, before use, the content of the sub-chambers 4, 5 are mixed by pressing 91 on the second sub-chamber 5 such that the peelable seal 41 breaks and liquid contents of the second sub-chamber 5 and the first sub-chamber 4 may be mixed. Next, thorough mixing is accomplished by repeatedly pressing 92 on the sub-chambers 4, 5.

Tests have shown that the configuration of the peelable seal 41 and the way it crosses the seam 10 allow the container 2 to withstand external forces commonly applied during handling and transportation. Still, the peelable seal 41 may be easily and in principle fully broken by pressing on the second sub-chamber 5 when deliberate mixing of contents is desired. The way the peelable seal 41 extends into the sections 25, 35 formed by the loop-shaped protrusion 23 and loop 33 assists the breaking of the peelable seal 41. Also, the welding of the peelable seal 41 over the protrusion 23 and loop 33 reduces the emergence of micro-fractures that otherwise may form at locations where the peelable seal 41 joins the seam 10.

The exact volumes of liquid contents that are filled in the sub-chambers may affect the breaking of the peelable seal, and may be empirically determined for obtaining proper seal-breakage.

For specifying some suitable measurements of the container 2, a distance between the first seam side 11 and the second seam side 12 may be 280 mm. All other distances and radial values in FIG. 1 may be proportional to this value. For example, a distance between the third seam side 13 and the second sub-chamber 5 may be 400 mm, while the radial value R3 may be 190 mm.

A volume of the first sub-chamber 4 may be at least six times greater than a volume of the second sub-chamber 5. This relationship between volumes allows the peelable seal 41 to be efficiently opened when a pressure is applied on the second sub-chamber 5, while still allowing the container 2 to withstand conventional handling and transportation without risking that the peelable seal 41 is unintentionally opened. The minimum relationship between volumes has been empirically determined in manual tests and by visual inspections of the opening of the peelable seal 41. During such tests, it was observed that the extension into the chamber 3 of the loop-shaped protrusion 23 and the welding of the peelable seal 41 over the protrusion 23 assist in a full opening of the peelable seal.

Figure 4:
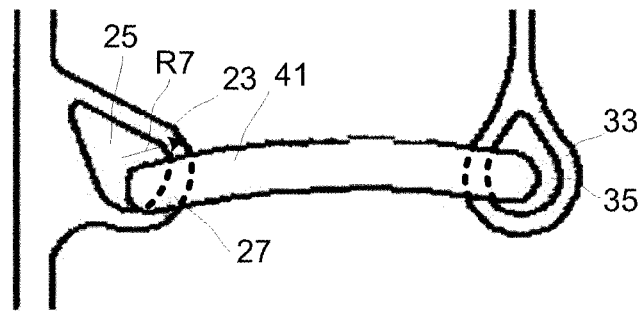
FIG. 4 is an enlarged, sectional view of a protrusion of a seam and a peelable seal used for the container of FIG. 1.

With reference to FIG. 4 the protrusion 23 is illustrated in further detail. As may be seen, the protrusion 23 has a bent or rounded shape. It may also be said the protrusion has a drop-formed shape. Also, the shape of the protrusion 23 may be defined by a radial value R7, which may have a value of 15 mm when employed in connection with the previously given measurements. The section 25 that is enclosed by the loop-shaped protrusion 23 may comprise a type of weld that is different from a weld type used for the seam 10 and for the peelable seal 41. Such different weld may provide a more flexible but still permanent weld, as compared with the weld type used for the seam.

Figure 5:
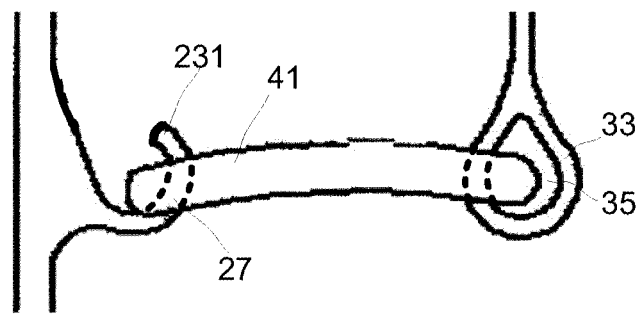
FIG. 5 illustrates a first alternative of the protrusion of FIG. 4.

With reference to FIG. 5 an alternative protrusion 231 is illustrated. This alternative protrusion 231 functionally corresponds to the protrusion 23 of FIG. 1, and has the form of an arc that extends into the chamber 3. Even if there is no section like the section 25 of FIG. 1, the peelable seal 41 still extends over the protrusion 231.

Figure 6:
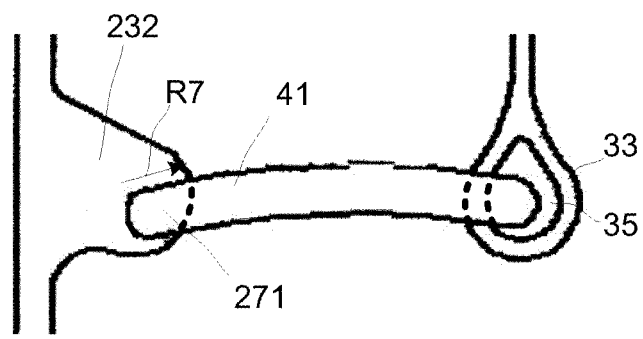
FIG. 6 illustrates second alternative of the protrusion of FIG. 4.

With reference to FIG. 6 another alternative protrusion 232 is illustrated. This alternative protrusion 232 functionally corresponds to the protrusion 23 of FIG. 1 but has no section like the section 25 of FIG. 1. In this case the peelable seal 41 extends over the protrusion 232 and intersects with the protrusion 232 at section 271. However, the protrusion 232 is generally less flexible than the protrusion 23 of FIG. 1 since the welded seam 10, which in this case includes the protrusion 232, is typically less flexible than unwelded parts of the container 2.

The respective features of the protrusions 23, 231, 232 described in connection with FIGS. 4-6 may be implemented as alternatives of the loop 33.

Figure 7:
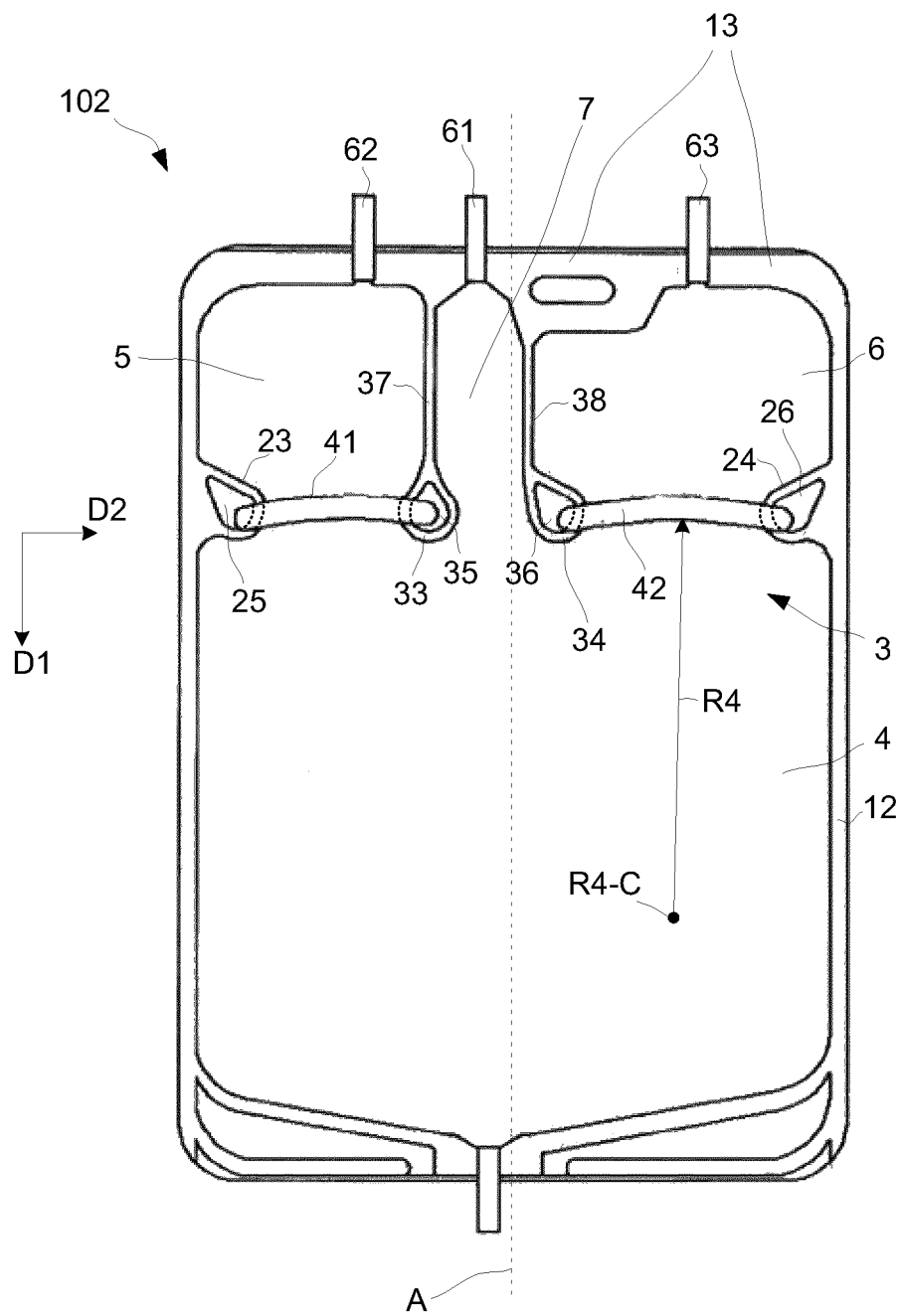
FIG. 7 is a front view of an alternative embodiment of a container with sub-chambers.

With reference to FIG. 7 an alternative embodiment of a container 102 is illustrated. This container 102 corresponds to the container 2 of FIG. 1 with the difference that it comprises a third sub-chamber 6 in addition to the first and the second sub-chambers 4, 5.

For purpose of forming the third sub-chamber 6 the seam 10 has a second elongated section 38 that protrudes into the chamber 3 from the third seam side 13. The second elongated section 38 extends substantially parallel to the elongated section 37, at a distance from the elongated section 37 as seen in the transverse direction D2. A second loop 34 is arranged at the end of the second elongated section 38 and forms a second enclosed section 36 that corresponds to the section 35. In principle, the loop 33 and the second loop 34 are similar but with the difference that the second loop 34 is inclined in a direction pointing away from the loop 33. This inclination and the transverse distance between the elongated sections 37, 38 are implemented for providing the first sub-chamber 4 with a filling channel 7 that may receive a liquid content from the first inlet 61.

The seam 10 comprises a second protrusion 24 on a substantially same, longitudinal height of the container 102 as the second loop 34. The second protrusion 24 extends from the second seam side 12 and into the chamber 3 and may be have the shape of a loop that that defines a section 26 where the side walls 8, 9 are not joined. Apart from being located at the second seam side 12, the second protrusion 24 and its section 26 may be similar with the protrusion 23 and its corresponding section 25. A second peelable seal 42 extends from the second protrusion 24 to the second loop 34, in a manner that corresponds to the extension of the peelable seal 41 from the protrusion 23 to the loop 33.

The second peelable seal 42 separates the chamber 3 into the first sub-chamber 4 and the third sub-chamber 6, and it intersects with the seam 10 at both the second protrusion 24 and at the second loop 34. The second peelable seal 42 may have a bent shape with a curvature that is defined by a radial value R4, which value in turn may be defined by a radial centre R4-C located in the first sub-chamber 4. The volume of the first sub-chamber 4 may be at least six times greater than a volume of the third sub-chamber 6.

A liquid content may be introduced into the third sub-chamber 6 via a port for a third inlet 63. The third inlet 63 is typically a tube made of plastic that is fused in-between the first side wall 8 and the second side wall 9.

A liquid content of the third sub-chamber 6 may by the same as a liquid content of the second sub-chamber 5. The content of the dialysis solution may then be formed by, before use, pressing on the second sub-chamber 5 and/or on the third sub-chamber 6 such that the peelable seal 41 and/or the second peelable seal 42 brakes. Liquid content of the first sub-chamber 4 may then be mixed with content(s) of the second sub-chamber 5 and/or the third sub-chamber 6, as chosen by a user such that a desired concentration of the dialysis solution may be obtained.

Figure 8:
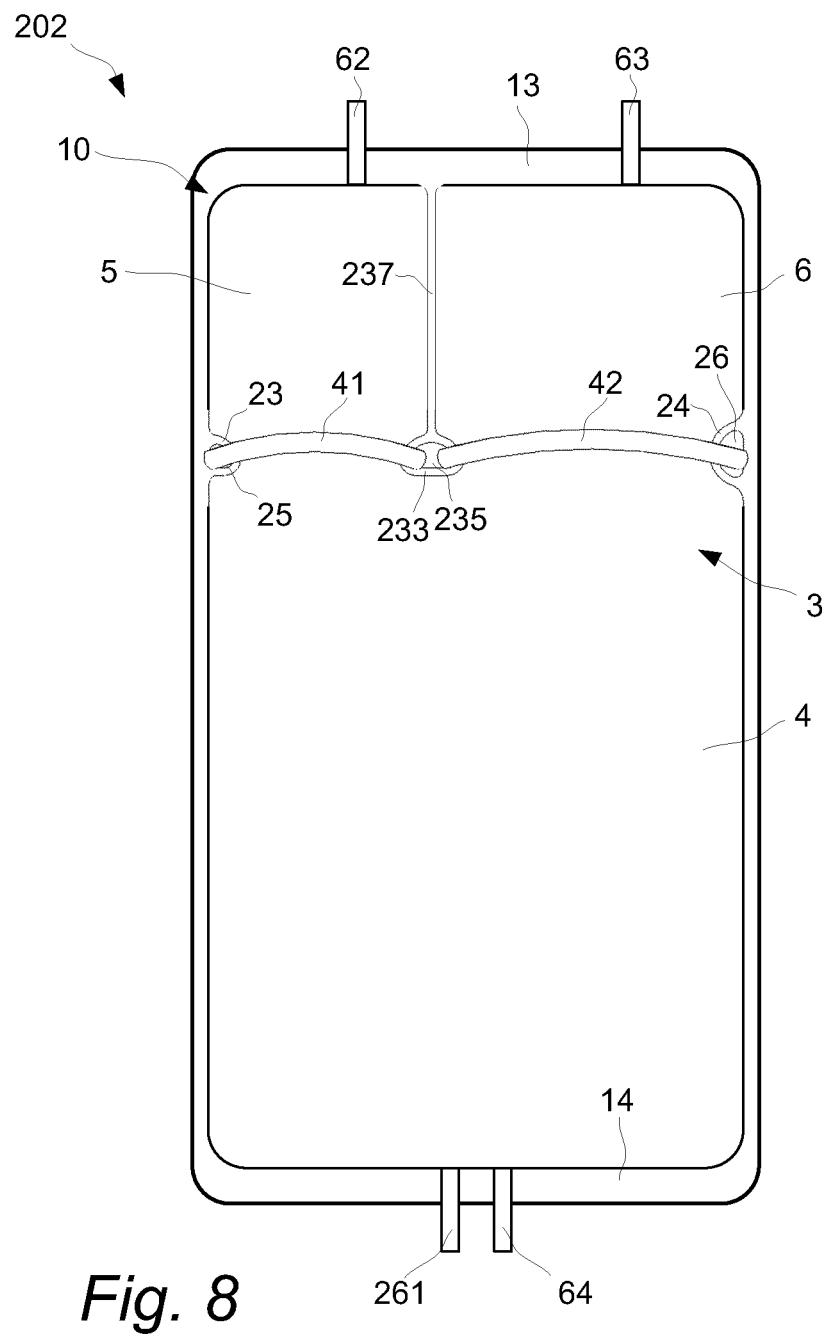
FIG. 8 is a front view of another alternative embodiment of a container with sub-chambers.

With reference to FIG. 8 another alternative embodiment of a container 202 is illustrated. This container 202 basically corresponds to the container 102 of FIG. 7, with the difference that a single elongated section 237 is protruding into the chamber 3 from the third seam side 13, the filling channel is omitted and an inlet is repositioned. The single elongated section 237 is a part of the seam 10. A loop 233 is arranged at the end of the single elongated section 237 and forms an enclosed section 235. The peelable seal 41 extends from the protrusion 23 to the loop 233 and the second peelable seal 42 extends from the second protrusion 24 to the same loop 233.

The peelable seals 41, 42 separate the chamber 3 into the first sub-chamber 4, the second sub-chamber 5 and the third sub-chamber 6, and intersect with the seam 10 at the loop 233. For this embodiment a liquid content may be introduced into the first sub-chamber 4 via a port for inlet 261 that is arranged near the port for outlet 64 at the fourth seam side 14. Of course the outlet 64 could serve as inlet and the inlet 261 could serve as an outlet.

As the skilled person realizes, the container described herein may be altered in numeral ways. In particular, several different types of peelable seals and permanent seams may be used, even though heat welded seams and seals are preferred. The seam may be welded in one operation, such that all its sides, protrusions/loops and elongated sections are simultaneously formed. Also, a relative size-difference between the sub-chambers may be different from the illustrated one, and the smaller sub-chamber(s) may be located at a different position.

Thus, although various embodiments of the invention have been described and shown, the invention is not restricted thereto, but may also be embodied in other ways within the scope of the subject-matter defined by the claims. Some of the disclosed embodiments may not fulfill all of the disclosed objectives.

The invention claimed is:

1. A container comprising:
   a first side wall and a second side wall, the first and second side walls permanently joined by first and second opposing seam sides, and a third seam side extending between the first and second seam sides, such that a chamber is formed between the side walls;
   a first protrusion having a first curved portion and extending from the first seam side into the chamber;
   a second protrusion having a second curved portion and extending from the third seam side into the chamber; and
   a peelable seal separating the chamber into a first sub-chamber capable of receiving a first liquid content and a second sub-chamber capable of receiving a second liquid content, thereby allowing, if the peelable seal is opened, a liquid content of the first sub-chamber to be mixed with a liquid content of the second sub-chamber, wherein the peelable seal overlaps and intersects the first and second curved portions of the first and second protrusions, respectively, and wherein at least one of the first protrusion and the second protrusion is loop-shaped.

2. A container according to claim 1, wherein at least one of the first and second protrusions protrudes into the chamber from an edge portion of the seam.

3. A container according to claim 1, wherein at least one of the first and second protrusions is arranged at an end of an elongated section of the seam that extends into the chamber.

4. A container according to claim 1, wherein the first side wall and the second side wall are not joined at a section enclosed by the loop.

5. A container according to claim 1, wherein each of the first protrusion and a portion of the second protrusion is loop-shaped.

6. A container according to claim 1, wherein a section of the peelable seal is, in a direction towards the second sub-chamber, offset from a line that extends between a first end point (P1) of the peelable seal and a second end point (P2) of the peelable seal.

7. A container according to claim 1, wherein the second sub-chamber is capable of containing a liquid to a relatively larger extent than the first sub-chamber.

8. A container according to claim 1, comprising a second peelable seal that separates the chamber into the first sub-chamber and a third sub-chamber capable of receiving a third content, thereby allowing, when the second peelable seal is opened, a content of the third sub-chamber to be mixed with a content of the first sub-chamber.

9. A container according to claim 8, wherein the second peelable seal is configured to separate the first and the third sub-chambers such that a volume of the first sub-chamber is at least six times greater than a volume of the third sub-chamber.

10. A container according to claim 1, wherein the first sub-chamber is capable of containing a first liquid content, the second sub-chamber is capable of containing a second liquid content, and a mixture of the liquid contents forms a dialysis solution.

11. A method for mixing contents of a container that comprises a first side wall and a second side wall permanently joined to the first side wall by first and second opposing seam sides, and a third seam side extending between the first and second seam sides, such that a chamber is formed between the side walls, a first protrusion having a first curved portion and extending from the first seam side into the chamber, a second protrusion having a second curved portion and extending from the third seam side into the chamber, where a peelable seal separates the chamber into a first sub-chamber comprising a first liquid content and into a second sub-chamber comprising a second liquid content, and where the peelable seal overlaps and intersects the first and second curved portions of the first and second protrusions, respectively, and wherein at least one of the first protrusion and the second protrusion is loop-shaped, the method comprising:

pressing on the second sub-chamber such that the peelable seal opens; and repeatedly pressing on each of the first and the second sub-chambers for allowing the first liquid content and the second liquid content to be mixed in the chamber.

* * * * *